United States Patent
Che et al.

(10) Patent No.: US 7,215,495 B1
(45) Date of Patent: *May 8, 2007

(54) SYSTEM AND METHOD FOR DETERMINING HEAD-DISK CONTACT IN A MAGNETIC RECORDING DISK DRIVE

(75) Inventors: Xiaodong Che, Saratoga, CA (US); Weidong Huang, San Jose, CA (US); Terence Tin-Lok Lam, Cupertino, CA (US); Zhong-heng Lin, Santa Clara, CA (US); Alex Shteyn, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/320,423

(22) Filed: Dec. 27, 2005

(51) Int. Cl.
  *G11B 27/36* (2006.01)
  *G11B 21/02* (2006.01)
  *G11B 5/02* (2006.01)

(52) U.S. Cl. ............................. 360/31; 360/75; 360/25

(58) Field of Classification Search .................... None
See application file for complete search history.

(56) References Cited

U.S. PATENT DOCUMENTS

| | | | |
|---|---|---|---|
| 5,021,906 A | 6/1991 | Chang et al. | |
| 5,130,866 A | 7/1992 | Klassen et al. | |
| 5,276,573 A | 1/1994 | Harada et al. | |
| 5,455,730 A | 10/1995 | Dovek et al. | |
| 5,991,113 A | 11/1999 | Meyer et al. | |
| 6,865,040 B2 | 12/2001 | Fayevlle et al. | |
| 6,344,949 B1 | 2/2002 | Albrecht et al. | |
| 6,407,874 B1 | 6/2002 | Smith et al. | |
| 6,417,981 B1 | 7/2002 | Smith | |

(Continued)

FOREIGN PATENT DOCUMENTS

JP     2004335069     11/2004

OTHER PUBLICATIONS

Smith et al., "Dynamic In-Situ Measurements of Head-to-Disk Spacing", IEEE Trans Magn, vol. 35, No. 5, Sep. 1999, pp. 2346-2351.

(Continued)

*Primary Examiner*—Andrew L. Sniezek
(74) *Attorney, Agent, or Firm*—Thomas R. Berthold

(57) ABSTRACT

A system and method for determining head-disk contact (HDC) in a magnetic recording disk drive uses the signal from the magnetoresistive (MR) read head. The analog MR signal is digitized and input to a digital signal processor with circuitry and/or software for integrating the signal amplitude over a low-frequency range. The calculated value from the integration when the slider is out-of-contact with the disk is a reference value. The same integration is then performed during operation of the disk drive and the measured value is compared to the reference value. If the measured value exceeds the reference value by some predetermined amount, this is an indication of the onset of HDC or that HDC has occurred. The method can be used in head-disk testers to facilitate the design and testing of disk drive components, such as slider-suspension assemblies and fly-height actuators located on the slider to alter the head-disk spacing, and in disk drives to control fly-height actuators and to take corrective action prior to HDC.

20 Claims, 5 Drawing Sheets

U.S. PATENT DOCUMENTS

| | | |
|---|---|---|
| 6,459,539 B1 | 10/2002 | Carlson et al. |
| 6,570,730 B1 | 5/2003 | Lewis et al. |
| 6,611,399 B1 | 8/2003 | Mei et al. |
| 6,671,110 B2 | 12/2003 | Baba et al. |
| 6,674,590 B2 | 1/2004 | Ottesen et al. |
| 6,717,776 B2 | 4/2004 | Boutaghou |
| 6,735,027 B2 | 5/2004 | Helsel et al. |
| 6,765,745 B2 | 7/2004 | Smith et al. |
| 6,775,103 B2 | 8/2004 | Kang et al. |
| 6,801,376 B2 | 10/2004 | Smith |
| 2001/0050826 A1 | 12/2001 | Helsel et al. |
| 2003/0067698 A1 | 4/2003 | Dakroub et al. |
| 2003/0156340 A1 | 8/2003 | Jen et al. |
| 2004/0179299 A1 | 9/2004 | Saski et al. |
| 2004/0218302 A1 | 11/2004 | Maat |
| 2004/0240099 A1 | 12/2004 | Brannon et al. |
| 2004/0240109 A1 | 12/2004 | Hamann et al. |
| 2005/0013036 A1 | 1/2005 | Yang |
| 2005/0024775 A1 | 2/2005 | Kurita et al. |
| 2005/0046982 A1 | 3/2005 | Liu et al. |
| 2005/0046985 A1 | 3/2005 | Morinaga et al. |
| 2005/0046988 A1 | 3/2005 | Suk |
| 2005/0046995 A1 | 3/2005 | Lille |
| 2005/0052773 A1 | 3/2005 | Suk |
| 2005/0057834 A1* | 3/2005 | Hirano et al. ............... 360/31 |
| 2005/0057841 A1 | 3/2005 | Stover et al. |
| 2005/0094299 A1 | 5/2005 | Tokizono et al. |
| 2005/0094303 A1 | 5/2005 | Chan |
| 2005/0024761 A1 | 7/2005 | Lou et al. |
| 2006/0119974 A1* | 6/2006 | Yamazaki et al. ............ 360/75 |

OTHER PUBLICATIONS

Li et al., "Real-Time Method to Measure Head Disk Spacing Variation Under Vibration Conditions", IEEE Trans on Instrumentation and MEAS, vol. 52, No. 3, Jun. 2003, pp. 916-920.

Tanaka et al., "Slider Dynamics During Continuous Contact with Textured and Smooth Disks in Ultra Low Flying Height", IEEE Trans Magn, vol. 37, No. 2, Mar. 2001, pp. 906-911.

Khurshudov et al., "Head-disk contact detection in the hard-disk drives", Wear 255 (2003) 1314-1322.

Hughes, "Improved Disk Drive Failure Warnings", IEEE Trans Reliability, Sep. 2002, pp. 1-10.

Nikitin, et al. "Spatial and temporal profiling of protrusion in magnetic recording heads", IEEE Transactions on Magnetics, vol. 40, No. 1, Jan. 2004, pp. 326-331.

* cited by examiner

SYSTEM AND METHOD FOR DETERMINING HEAD-DISK CONTACT IN A MAGNETIC RECORDING DISK DRIVE

RELATED APPLICATION

Concurrently-filed application Ser. No. 11/320,425 relates to a SYSTEM AND METHOD FOR CALIBRATING AND CONTROLLING A FLY-HEIGHT ACTUATOR IN A MAGNETIC RECORDING DISK DRIVE.

BACKGROUND OF THE INVENTION

1. Field of the Invention

This invention relates to magnetic recording disk drives, and more particularly to a system and method for determining contact of the read/write head or the head carrier with the disk.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation between the head and the disk surface is called the fly height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly height are influenced by factors such as the rotation speed of the disk, the aerodynamic shape of the slider's ABS, the load force applied to the slider by the suspension, and the pitch and roll torques applied to the slider by the suspension.

Disk drives are susceptible to failure of the slider-disk interface which can result in a head "crash" during operation. This may result in loss of data or complete failure of the disk drive. Thus it is important that contact of the slider with the disk, or contact of the read or write head with the disk, collectively called head-disk contact (HDC), be detectable or predictable so that head crashes can be prevented.

Disk drives have been proposed that use a fly-height actuator for changing the spacing between the head and the disk surface. One type of fly-height actuator is a thermal actuator with an electrically-resistive heater located on the slider near the head. When current is applied to the heater the heater expands and moves the head closer to the disk surface. Other fly-height actuators for moving the head relative to the slider include electrostatic microactuators and piezoelectric actuators. Another type of fly-height actuator, also based on thermal, electrostatic or piezoelectric techniques, changes the head-disk spacing by altering the airflow or the shape of the slider's ABS. In disk drives that have a fly-height actuator it is also important to be able to determine the onset of HDC so that the fly-height actuator can be accurately controlled.

A method for determining HDC is also important during the design and testing of disk drive components, in particular the slider ABS and the fly-height actuator.

SUMMARY OF THE INVENTION

The invention is system and method for determining HDC in a disk drive using the signal from the magnetoresistive (MR) read head. The signal is measured over a low-frequency range, with the slider out-of-contact with the disk, to develop a reference value. The signal is then measured over the same low-frequency range and this measured value is compared to the reference value. In one aspect of the system and method, the analog MR signal is digitized and input to a digital signal processor with circuitry and/or software for integrating the signal amplitude over a low-frequency range, preferably between about 0.1 and 2 MHz. The calculated value from the integration when the slider is out-of-contact with the disk is the reference value. The same integration is then performed during operation of the disk drive, when the spacing between the head and disk can vary, and the measured value is compared to the reference value. If the measured value exceeds the reference value by some predetermined amount, this is an indication of the onset of HDC or that HDC has occurred.

The method has application in head-disk testers or "spin stands" to facilitate the design and testing of slider-suspension assemblies and fly-height actuators, as well as in disk drives to take corrective action before HDC and/or to control fly-height actuators. The invention is also a magnetic recording disk drive that has a fly-height actuator and a digital signal processor with circuitry and/or software that performs the above-described integration and comparison. When the processor determines the onset of HDC or that HDC has occurred, it generates a control signal that can be used to cause the fly-height actuator to increase the head-disk spacing or to take corrective action, such as inhibiting the writing of data.

For a fuller understanding of the nature and advantages of the invention, reference should be made to the following detailed description taken together with the accompanying figures.

DETAILED DESCRIPTION OF THE INVENTION

The invention is applicable not only to magnetic recording disk drives, but also to head-disk testers or "spin stands" that are used in disk drive manufacturing to design and test the head-disk interface in magnetic recording disk drives. The invention is applicable to conventional disk drives that do not have active control of the head-disk spacing, as well as to disk drives with head fly-height actuators that move the read-write head relative to the slider or alter the air-flow or shape of the slider's air-bearing surface (ABS) to control the head-disk spacing.

Figure 1:
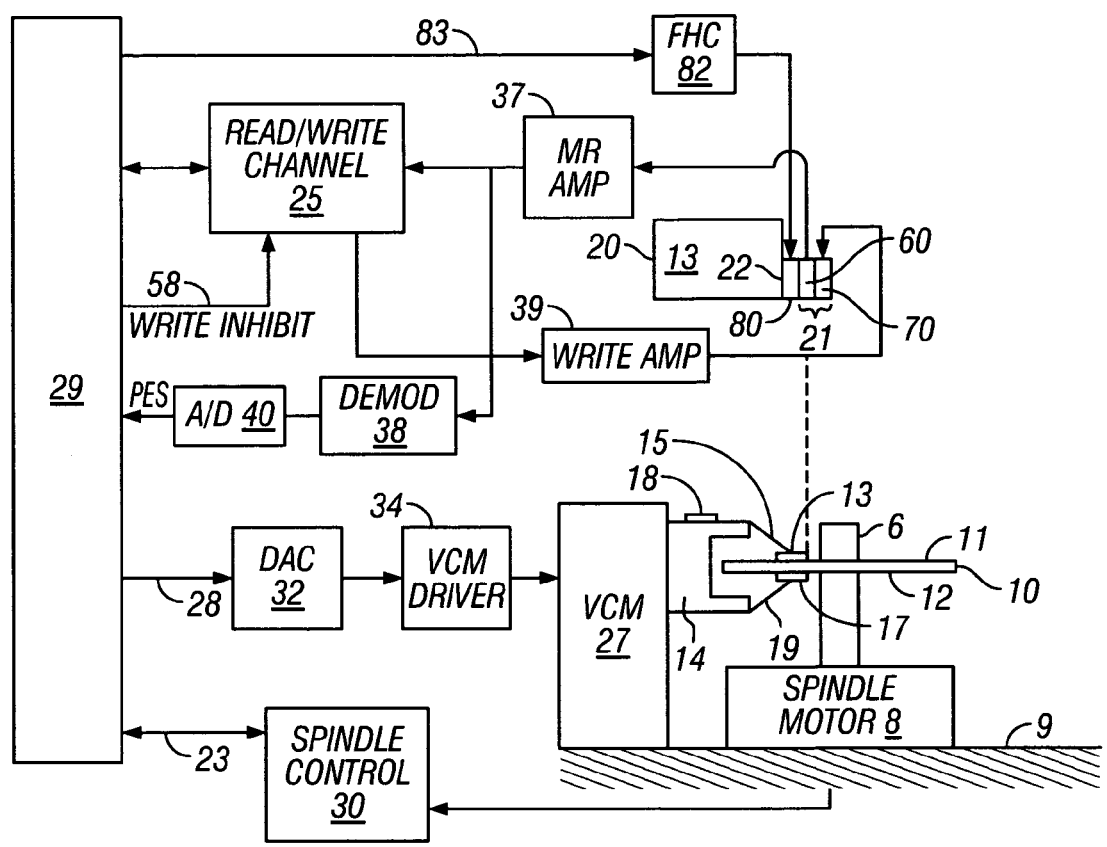
FIG. 1 is a schematic block diagram of a magnetic recording disk drive.

FIG. 1 is a schematic block diagram of a magnetic recording disk drive. The disk drive includes a magnetic recording disk 10 with surfaces 11 and 12, each of which contains a magnetic recording layer. The disk 10 is mounted on a spindle 6 and rotated by a spindle motor 8 about an axis perpendicular to the disk surfaces 11, 12. A head carrier or slider 13 is positioned near the surface 11 of disk 10. Slider 13 is an air-bearing slider having an air-bearing surface (ABS) 20 facing toward the disk surface 11 and a trailing end 22. Slider 13 supports a read/write transducer or head 21 on its trailing end 22 for reading and writing data to the magnetic media on disk surface 11. The head 21 is a dual-element head having an inductive write element or head 70 and an MR read element or head 60. Slider 13 is attached to an actuator arm 14 by means of a suspension 15. The suspension 15 provides a spring force that biases the slider 13 toward the disk surface 11. A second head carrier or slider 17, also supporting a read/write head, is positioned on surface 12 of disk 10 and is attached to actuator arm 14 by means of suspension 19.

Actuator arm 14 is attached to a rotary actuator 27. The actuator is typically a rotary voice coil motor (VCM) that comprises a coil movable within a fixed magnetic field, the direction and velocity of the coil movements being controlled by motor current signals supplied by a hard-disk controller 29. As the disk 10 rotates, the rotary actuator 27 moves the sliders 13, 17 in a generally arcuate path radially in and out over their respective disk surfaces 11, 12 so that the read/write heads may access different portions of the magnetic recording layers where data is desired to be read or recorded. Both the actuator 27 and spindle motor 8 are mounted to a portion of the disk drive housing 9.

Figure 2:
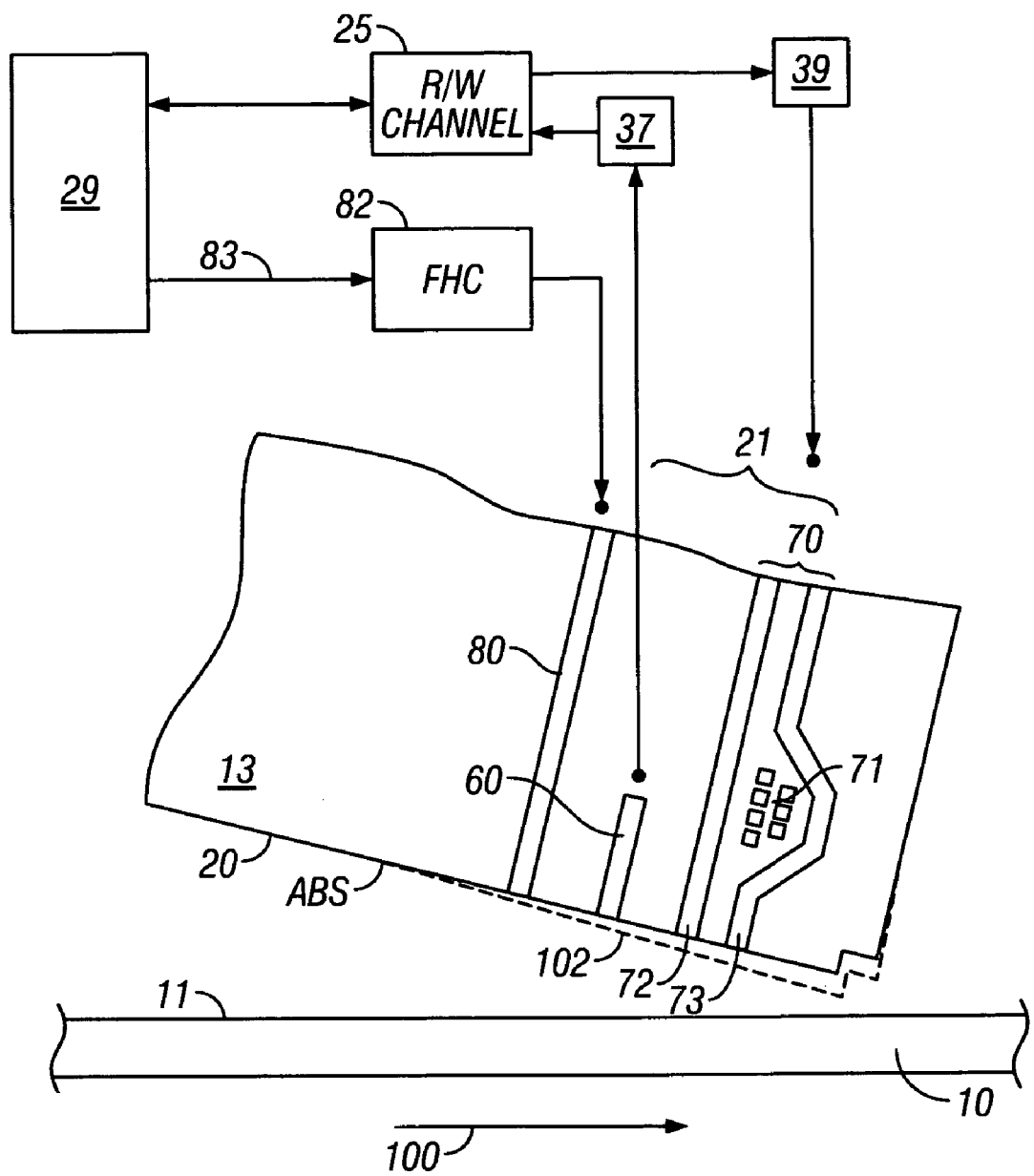
FIG. 2 is a sectional view of the end portion of air-bearing slider above the surface of a disk and illustrates a thermal fly-height actuator, a read head and a write head on the slider.

FIG. 2 is a sectional view of the end portion of slider 13 above the surface 11 of disk 10. The rotation of the disk 10 in the direction of arrow 100 generates an air bearing between the ABS of slider 13 and disk surface 11. During operation of the disk drive, the air bearing counterbalances the slight spring force of the suspension and supports the slider 13 off and slightly away from the disk surface 11 by a small, substantially constant spacing. FIG. 2 also shows the read/write head 21, i.e., a magnetoresistive (MR) read head 60 and write head 70. Write head 70 is an inductive write head with coil 71 located between the two write poles 72, 73.

The slider 13 also includes a fly-height actuator for changing the spacing between read/write head 21 and the disk surface 11. The type of fly-height actuator shown in FIG. 2 is a thermal actuator with an electrically-resistive heating element or heater 80 electrically connected to and controlled by a fly-height controller (FHC) 82. FHC 82 is a power source that controls the amount of current to the heater 80, such as by controlling the settings of a variable resistor. As the current increases, the heater 80 expands and moves the MR read head 60 and pole tips 71, 72 of write head 70 closer to disk surface 11, as shown by the dashed line 102. The FHC 82 may include a temperature feedback control circuit that monitors the temperature of the heater 80 to maintain the fly height of the head within a desired range during operation of the disk drive.

A thermal fly-height actuator is described in U.S. Pat. No. 5,991,113 and published patent application U.S. 2005/0024775 A1. Other fly-height actuators for moving the head relative to the slider include electrostatic microactuators, such as described in U.S. Pat. No. 6,611,399 B1, and piezoelectric actuators, such as described in U.S. Pat. No. 6,570,730 B1. Another type of fly-height actuator changes the head-disk spacing by altering the air-flow or the shape of the slider's ABS. This type of fly-height actuator includes thermal actuators, such as described in U.S. Pat. No. 6,775,103 B2, electrostatic actuators, such as described in U.S. Pat. Nos. 5,276,573 and 6,344,949, and piezoelectric actuators, such as described in U.S. Pat. No. 5,021,906.

Referring again to FIG. 1, the various components of the disk drive are controlled by control signals generated by the controller 29. Controller 29 is a digital signal processor that includes logic control circuits, memory storage, and a microprocessor. Controller 29 generates control signals for the various drive operations, such as control signals on line 23 to spindle motor controller 30, track following and track seek control signals on line 28 for actuator 27, and control signals on line 83 to FHC 82.

Data from disk surface 11 is read by the MR read head 60. The MR signal is amplified by amplifier 37. The amplifier 37 and other read signal processing circuitry, as well as the circuitry for generating the sense or bias current to the MR read head 60, are typically part of an integrated circuit module 18 (FIG. 1) located on actuator arm 14. The module 18 is placed close to the read/write head 21 to keep the interconnections as short as possible, and is thus called the arm electronics module. The output from MR amplifier 37 is sent to the read/write (R/W) channel 25 where the analog signal from the MR read head 60 is processed into digital signals representing data recorded on the magnetic recording layer of disk surface 11. R/W channel 25 typically includes circuitry for automatic gain control, analog to digital conversion, and digital data detection.

Data is written to the magnetic recording layer of disk surface 11 by write signals sent through R/W channel 25 and write amplifier 39 to inductive write head 70. Write amplifier 39 is typically located in arm electronics module 18. The disk drive may also include the ability to inhibit the writing of data upon the occurrence of some event, typically an external shock or an impending head crash. This is accomplished by a "write inhibit" signal from controller 29 on line 58 to the R/W channel 25.

The track following and seek control signals on line 28 are generated by controller 29 that runs a servo control algorithm in response to input head position error signals (PES). The MR read head 60 reads head position servo information recorded on the disk, typically at equally angularly spaced servo sectors embedded between the data sectors. This analog servo output from MR amplifier 37 is demodulated by demodulator 38 and converted to a digital position error signal (PES) by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of VCM actuator 27 to pivot the arm 14 radially inward and outward to move and position the sliders 13, 17 to the desired data tracks on the respective disk surfaces 11, 12.

The invention is a system and method for determining head-disk contact (HDC) in a disk drive using the MR signal. The term "head-disk contact" or HDC means that some portion of the slider, such as the read head 60, the write head 70, or the trailing end 22, is in contact with the disk surface 11. The term "determining" HDC means detecting the onset of HDC or concluding that HDC has occurred or is imminent.

A low-frequency oscillation of the MR signal has been observed at the onset of HDC and during HDC. This signal is called the HDC oscillation signal because it is caused entirely by the effect of HDC. The first harmonic frequency of HDC oscillation was found to be very close to the slider pitch mode resonant frequency. The signal is not sensitive to many other factors, like radial position of the head on the disk, disk RPM and the type of disk (metal or glass substrate). Thus, the HDC oscillation signal is relatively easy to detect for different disk drives and different slider-suspension assemblies.

Figure 3A:
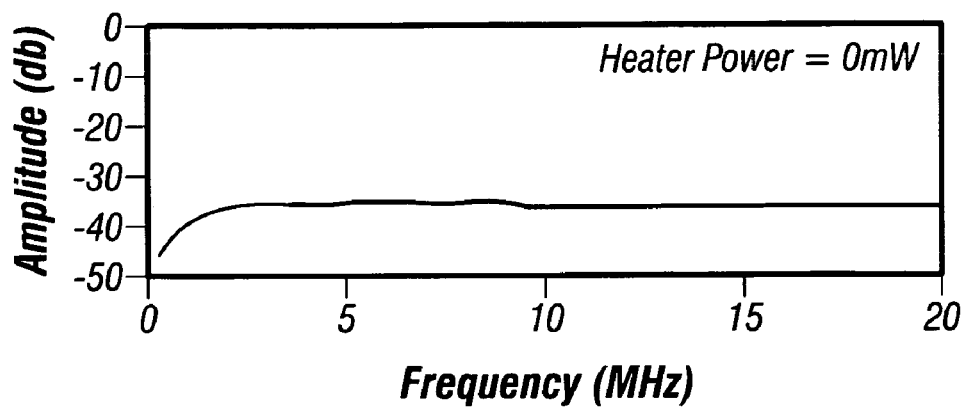
FIGS. 3A–3C show the read signal amplitude as a function of frequency for three increasing levels of power applied to the thermal fly-height actuator.
Figure 3B:
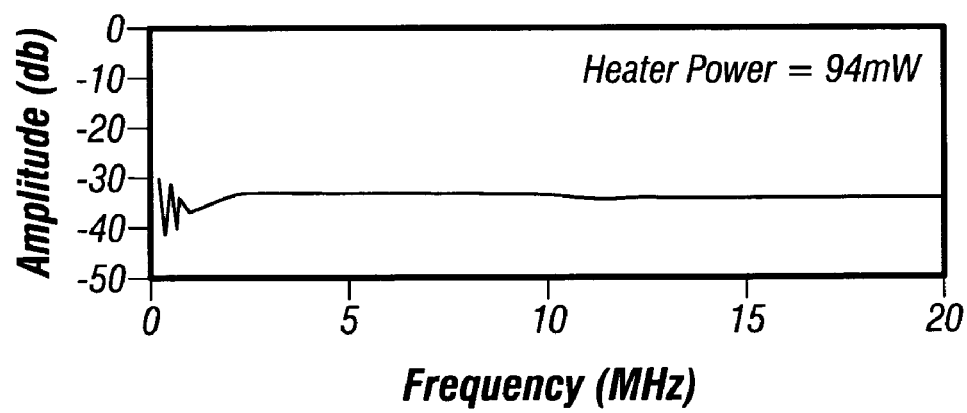
Figure 3C:
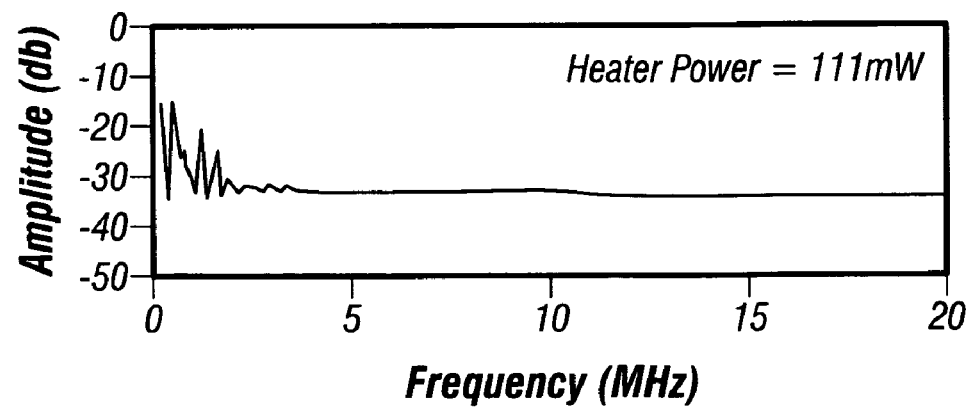
Figure 4:
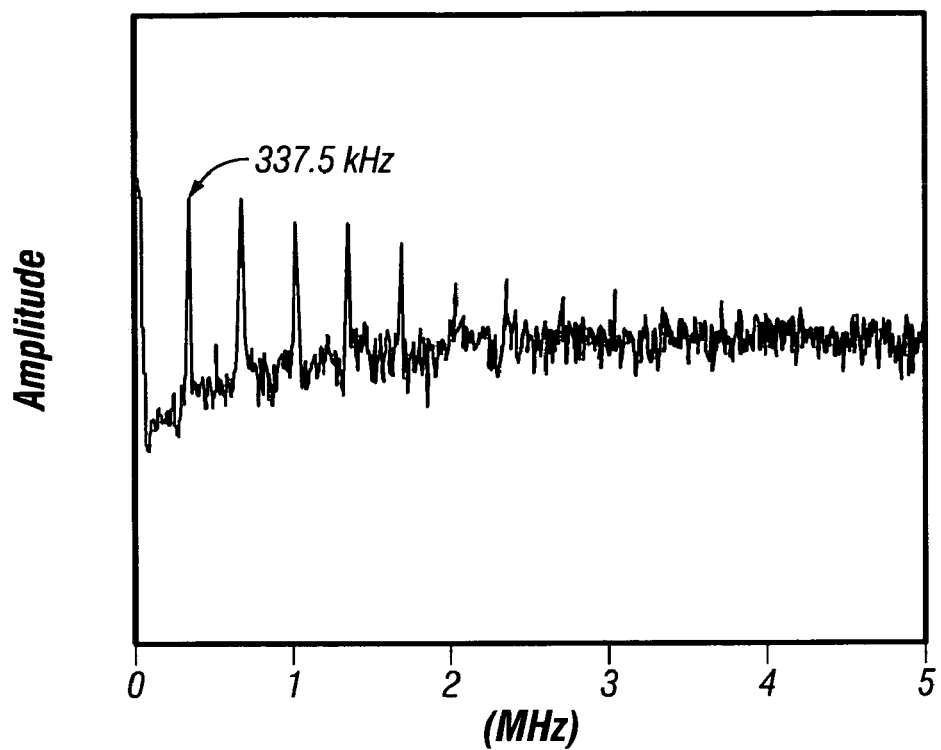
FIG. 4 is a Fourier transform of the head-disk contact (HDC) oscillation signal at low frequency for a specified power applied to the thermal fly-height actuator.

HDC oscillation was measured in a disk drive with a thermal fly-height actuator for various levels of heater power. FIGS. 3A–3C show the MR signal amplitude as a function of frequency for three different levels of heater power. In FIG. 3A no power is applied to the heater and thus the head is not in contact with the disk, with the fly height being determined essentially by the air-bearing between the slider and the rotating disk. In FIG. 3B the applied heater power is 94 mW and there is an onset of HDC, as shown by the signal amplitude below 1 MHz. In FIG. 3C, the applied heater power is 111 mW and HDC has occurred. FIG. 4 shows the Fourier transform component of the HDC oscillation signal below about 2 MHz for an applied heater power of 120 mW, with the first harmonic frequency being at about 337.5 kHz. For this particular slider-suspension assembly the slider resonant frequency for the pitch mode was about 284 kHz.

Figure 5:
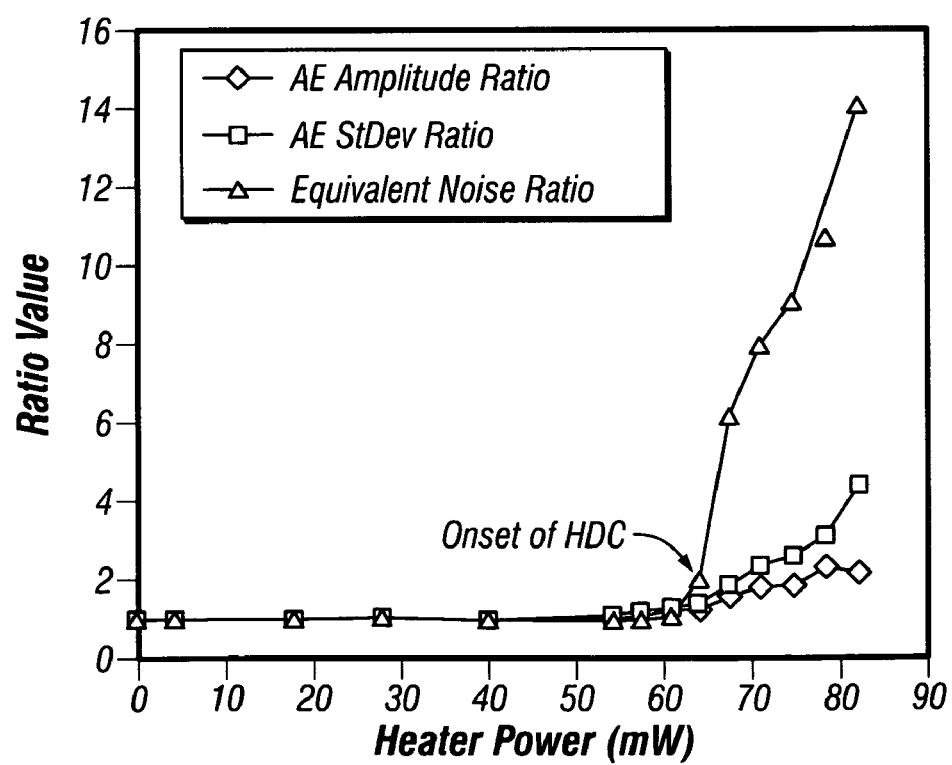
FIG. 5 shows three parameters (integrated equivalent noise ratio due to HDC, output amplitude ratio of a conventional acoustic-emission sensor, and the acoustic-emission standard deviation ratio) vs. heater power for a particular slider-suspension assembly.

Because the HDC oscillation occurs at relatively low frequency, the integrated power spectrum (also called the integrated "spectral density" in digital signal processing technology) can be used to determine HDC. FIG. 5 shows three parameters (integrated equivalent noise ratio due to HDC, output amplitude ratio of a conventional acoustic-emission sensor, and the acoustic-emission standard deviation ratio) vs. heater power for a particular slider-suspension assembly. The integrated equivalent noise ratio is a ratio of integrated equivalent noise with heater power tested to that with zero power, i.e., the ratio of measured integrated spectral density to the integrated spectral density reference value. The frequency range of interest is from about 0.1 to 2 MHz, depending on the mechanical property of the HGA (the "head-gimbal-assembly", a system including the suspension and slider with the read/write head). For the data of equivalent noise ratio shown in FIG. 5, the frequency range was selected from 0.3 to 1.0 MHz to sufficiently cover the mechanical resonance vibration frequencies of the HGAs being tested. In this frequency range the output of the MR head is almost entirely noise so the integrated power spectrum can also be considered as integrated equivalent noise. If there is no HDC, the MR signal is normal low-frequency noise of the recording system and the integrated spectral density, i.e., the integration of the signal amplitude over the frequency range of interest, will be very low. This value can be used as a reference value. When the head starts to contact the disk as heater power is increased, the measured value of integrated spectral density will increase and will continue to increase with increasing heater power. When the heater power is greater than the power at which the onset of HDC occurs, the measured value will increase dramatically with increasing heater power. Thus, from the turning point of the curve for integrated equivalent noise vs. heater power, the onset of HDC can be determined and correlated with the corresponding heater power.

In FIG. 5, the onset of HDC occurs at a heater power of about 64 mW, which corresponds to an integrated equivalent noise ratio of approximately 1.9. To verify this as the correct onset point for HDC, an acoustic-emission (AE) sensor was mounted on the arm supporting the slider-suspension assembly, and the AE sensor amplitude ratio and its standard deviation (StDev) ratio were measured and plotted in FIG. 5. The AE amplitude ratio and StDev ratio in FIG. 5 are the ratios of AE sensor amplitude and StDev with heater power tested to AE sensor amplitude and StDev, respectively, at zero heater power. Good correlation between integrated equivalent noise ratio and AE amplitude ratio and StDev ratio shows not only that the method of determining HDC using the HDC oscillation signal is very effective, but also that it is an earlier indicator of HDC onset. As shown in FIG. 5, the integrated equivalent noise ratio due to HDC oscillation increases much faster than the other two parameters. This shows that using the HDC oscillation signal to determine HDC is more effective than using an AE sensor. The integrated equivalent noise ratio at onset of HDC can be determined experimentally for the particular slider-suspension assembly under study. Since the ratio rises rapidly, as shown in FIG. 5, a lower or higher ratio can be selected as the threshold ratio to determine HDC, depending on the action to be taken when HDC is determined. For example, in FIG. 5 it appears that the change in the ratio curve occurs when the integrated equivalent noise is about 90% greater than the integrated equivalent noise for zero heater power (a ratio of 1.9). However, if it is desired to minimize HDC, then for example a threshold ratio of 1.3 can be selected as a safety margin. Similarly, if it is desired that HDC be absolutely established, then for example a threshold ratio of 6.0 can be selected.

When the method of the invention is used in a head-disk tester it facilitates the design of disk drive components. For disk drives without fly-height actuators, the method allows particular slider-suspension assemblies, slider designs and air-bearing shapes to be evaluated. With the assembly or slider to be studied placed in the spin stand, the disk rotational speed can be reduced until HDC is determined, in the manner described above, to evaluate the flying characteristics of the slider. For disk drives with fly-height actuators, the method allows particular fly-height actuators to be evaluated by determining the value of the FHC signal, e.g., heater power for a thermal actuator, at which HDC occurs.

The data shown in FIGS. 3–5 was accumulated using a head-disk tester or spin stand, such as the Guzik Model V2002 XY-positioning spin stand from Guzik Technical Enterprises, with the MR signal being input to either an internal spectrum analyzer on the Guzik spin stand or an external commercially available spectrum analyzer or digital oscilloscope. Digital oscilloscopes and digital disk drive analyzers, such as those available from LeCroy Corporation, digitize the MR signal by an analog-to-digital converter (ADC) to create a data set that is stored in the memory of a microprocessor. The data set is processed and sent to the display. In addition, complex processing of the digital signal can be performed by high-speed digital signal processing circuits. The oscilloscope or analyzer includes programmable signal analysis software that can extract many useful time-domain features (e.g., rise time, pulse width, amplitude), frequency spectra, and other parameters, and is thus able to calculate the integrated spectral density of the MR signal.

Figure 6:
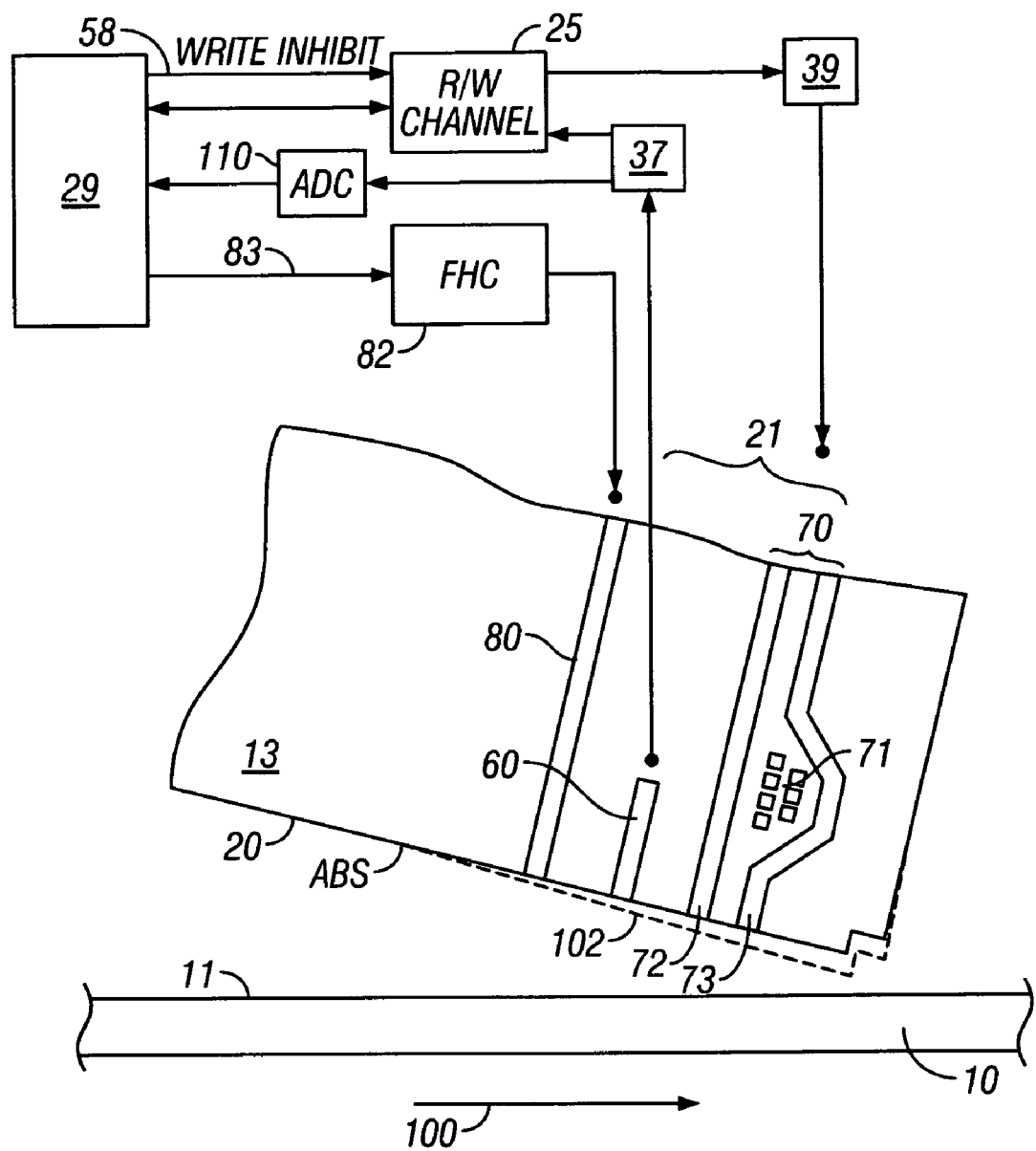
FIG. 6 is a schematic block diagram a magnetic recording disk drive that incorporates the method for determining HDC according to this invention.

However, the method of the invention can also be implemented in a disk drive. As shown in FIG. 6, the MR signal from MR amplifier 37 is also sent to an ADC 110 and then input to controller 29. The same digital signal processing techniques and data analysis performed by the digital oscilloscope or disk drive analyzer can be programmed into controller 29. Thus controller 29 analyzes the digitized MR signal and runs the program to calculate the integrated reference value and the integrated measured value and generates a control signal when the integrated equivalent noise ratio exceeds a predetermined threshold, thus indicating or signaling the onset of HDC. In one example the control signal on line 58 would be a "write inhibit" signal sent to R/W channel 25 to prevent the write head 70 from writing data because of an impending head crash. In another example, the control signal on line 83 would signal the FHC 82 to reduce heater power to move the head away from the disk.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for determining head-disk contact in a magnetic recording disk drive, the disk drive having a magnetic recording disk, an air-bearing slider maintained near the surface of the rotating disk, a read/write head on the slider, and a head fly-height actuator for changing the spacing between the head and the disk surface, the method comprising:

rotating the disk about an axis substantially perpendicular to the disk surface;

maintaining the air-bearing slider near the surface of the rotating disk;

recording the read signal from the head over a predetermined frequency range as a reference value;

activating the actuator to reduce the spacing between the head and the disk surface; and measuring the read signal from the head over said predetermined frequency range, wherein head-disk contact is determined when said measured value is greater than said reference value by a predetermined amount.

2. The method of claim 1 wherein activating the actuator comprises continuously reducing said spacing, and wherein measuring the read signal comprises continuously measuring the read signal as said spacing is reduced.

3. The method of claim 1 wherein recording the read signal from the head over a predetermined frequency range comprises integrating the amplitude of the read signal over said predetermined frequency range as an integrated reference value, and wherein measuring the read signal from the head over a predetermined frequency range comprises integrating the amplitude of the read signal over said predetermined frequency range.

4. The method of claim 3 wherein said predetermined frequency range is between about 0.1 and 2 MHz.

5. The method of claim 3 wherein head-disk contact is determined when the ratio of said integrated measured value to said integrated reference value is greater than a predetermined threshold.

6. The method of claim 5 further comprising inhibiting writing by the write head when said integrated reference value is greater than said threshold.

7. The method of claim 1 wherein the head fly-height actuator is located on the slider and is one of a thermal actuator, an electrostatic actuator and a piezoelectric actuator.

8. The method of claim 7 wherein the head fly-height actuator moves the read/write head relative to the slider.

9. A method for determining head-disk contact in a magnetic recording disk drive, the disk drive having a magnetic recording disk, an air-bearing slider maintained near the surface of the rotating disk, and a read/write head on the slider, the method comprising:

rotating the disk about an axis substantially perpendicular to the disk surface;

maintaining the air-bearing slider near the surface of the rotating disk;

digitizing the signal from the read head;

integrating the amplitude of the digitized signal over a predetermined frequency range when the slider is out of contact with the surface of the rotating disk;

recording said integrated out-of-contact signal as a reference value;

reducing the spacing between the slider and the surface of the rotating disk and thereafter integrating the amplitude of the digitized signal over said predetermined frequency range as a measured value; and signaling head-disk contact when said measured value is greater than said reference value by a predetermined amount.

10. The method of claim 9 wherein said predetermined frequency range is between about 0.1 and 2 MHz.

11. The method of claim 9 wherein signaling head-disk contact comprises inhibiting writing by the write head.

12. The method of claim 9 wherein the disk drive includes a head fly-height actuator for changing the spacing between the head and the disk surface, and further comprising, after recording said integrated out-of-contact signal, activating the actuator to continuously reduce said spacing.

13. The method of claim 12 wherein signaling head-disk contact comprises causing the head fly-height actuator to increase said spacing.

14. The method of claim 12 wherein the head fly-height actuator is located on the slider and is one of a thermal actuator, an electrostatic actuator and a piezoelectric actuator.

15. The method of claim 14 wherein the head fly-height actuator moves the read/write head relative to the slider.

16. A system for determining head-disk contact in a magnetic recording disk drive comprising:

a rotatable magnetic recording disk;

an air-bearing slider maintained near the surface of the disk when the disk is rotating;

a read/write head on the slider;

a fly-height actuator for changing the spacing between the read/write head and the disk surface;

an analog-to-digital converter for digitizing the signal from the read head;

a digital signal processor for processing the digitized signal from the read head; and a program of instructions readable by the processor for undertaking method acts comprising (a) integrating the amplitude of the digitized signal over a predetermined frequency range when the slider is out of contact with the surface of the rotating disk, (b) recording said integrated out-of-contact signal as a reference value, (c) causing the fly-height actuator to decrease the spacing between the read/write head and the disk surface, thereafter (d) integrating the amplitude of the digitized signal over said predetermined frequency range as a measured value, and (e) signaling head-disk contact when said measured value is greater than said reference value by a predetermined amount.

17. The system of claim 16 wherein the act of signaling head-disk contact comprises inhibiting writing by the write head.

18. The system of claim 16 wherein signaling head-disk contact comprises causing the fly-height actuator to increase said spacing.

19. The system of claim 16 wherein the fly-height actuator is one of a thermal actuator, an electrostatic actuator and a piezoelectric actuator.

20. The system of claim 16 wherein the system is a head-disk tester.

* * * * *